US006262158B1

(12) United States Patent
Mizuno et al.

(10) Patent No.: US 6,262,158 B1
(45) Date of Patent: Jul. 17, 2001

(54) RUBBER COMPOSITION FOR TIRE TREAD

(75) Inventors: Yoichi Mizuno, Osaka; Toshiro Matsuo, Kakogawa, both of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/340,119

(22) Filed: Jun. 28, 1999

(30) Foreign Application Priority Data

Jul. 2, 1998 (JP) .................................................. 10-187296

(51) Int. Cl.[7] .............................. C08K 5/32; C08K 3/04; B06C 11/00
(52) U.S. Cl. .................... 524/236; 524/495; 152/151; 152/209 RR
(58) Field of Search ................................... 524/260, 495; 152/151, 209 RR

(56) References Cited

U.S. PATENT DOCUMENTS 5,002,829  3/1991  Shibahara .
5,387,631  2/1995  Kawakami et al. .
5,830,930 * 11/1998 Mahmud et al. ..................... 524/495

FOREIGN PATENT DOCUMENTS

| 0345594 A2 | 12/1989 | (EP) . |
| 12-47437 | 10/1989 | (JP) . |
| 13-11141 | 12/1989 | (JP) . |
| 04214748 | 8/1992 | (JP) . |
| 8-73657 | 3/1996 | (JP) . |

* cited by examiner

*Primary Examiner*—Tae Yoon
(74) *Attorney, Agent, or Firm*—Birch, Stewart, Kolasch & Birch, LLP

(57) ABSTRACT

There is provided a rubber composition for tyre tread, which decreases rolling resistance without decreasing abrasion resistance. The rubber composition for tyre tread is obtained by mixing 100 parts by weight of a rubber component, 0.5 to 1 part by weight of N,N'-bis(2-methyl-2-nitropyl)-1,6-hexane-diamine 1 to 1.5 parts by weight of sulfur and 1 to 3 parts by weight of a vulcanization accelerator, and wherein an amount X of sulfur and an amount Y of a vulcanization accelerator satisfy the equation: $2X-1 \leq Y \leq 2X$.

5 Claims, No Drawings

RUBBER COMPOSITION FOR TIRE TREAD

BACKGROUND OF THE INVENTION

The present invention relates to a rubber composition for a tyre read having low fuel consumption.

Recently low fuel consumption of vehicles has been socially demanded, and a tyre for low fuel consumption has been widely developed which decreases rolling resistance. In order to decrease the rolling resistance, it is conventional to lower the hysteresis of the rubber composition for tyre tread.

As one of the methods for solving the above issues, is effective to decrease the amount of carbon black in a rubber composition for a tyre tread or to employ silica as a reinforcing agent.

However, it is undesirable to decrease the amount of carbon black particularly in tread for a truck or bus tyre, since the abrasion resistance becomes remarkably low with a decreasing of the amount of carbon black. Another problem is caused by employing silica which causes an inferior abrasion property under a severe running condition test with heavy load.

Therefore, Japanese Examined Patent Publication No. 62093/1995, for example, discloses a rubber composition excellent in properties such as tread cut resistance without decreasing the abrasion property, which is obtained by the particular mixing ratio of sulfur and a vulcanization accelerator. But the rubber composition obtained by the technology still has a problem of high rolling resistance and low abrasion property.

SUMMARY OF THE INVENTION

To solve the above problems, it has been sought out to obtain a rubber composition for tyre tread, of which rolling resistance is decreased without decreasing abrasion resistance by the careful investigations of the mixing ratio between sulfur and a vulcanization accelerator. Therefore, the object of the present invention is to provide a rubber composition for tyre tread, of which rolling resistance is decreased without decreasing abrasion resistance.

Namely, the present invention relates to a rubber composition for tyre tread which is obtained by mixing 100 parts by weight of a rubber component, 0.5 to 1 part by weight of N,N-bis(2-methyl-2-nitropropyl)-1,6-hexane-diamine, 1 to 1.5 parts by weight of sulfur and 1 to 3 parts by weight of a vulcanization accelerator based on 100 parts by weight of the rubber component, and wherein an amount X of sulfur and an amount Y of a vulcanization accelerator satisfy the equation: $2X-1 \leq Y \leq 2X$.

In this case it is preferable that the composition further comprises 25 to 60 parts by weight of carbon black.

DETAILED DESCRIPTION

There is no particular limitation for the rubber component employed in the present invention, as long as it has been conventionally employed in tyre tread. Examples thereof are a natural rubber, a butadiene rubber, an isoprene rubber, and a styrene-butadiene rubber having a little inferior effect. These can be employed solely or in a combination use of two or more thereof.

In the present invention 0.5 to 1 part by weight of N,N'-bis(2-methyl-2-nitropropyl)-1,6-hexane-diamine based on 100 parts by weight of the rubber component is mixed in order to control increase of loss tangent and to decrease heating. From the viewpoint of lowering cost, 0.5 to 0.8 part by weight thereof is preferably mixed.

In the present invention 1 to 1.5 parts by weight of sulfur based on 100 parts by weight of the rubber component is mixed in order to provide necessary cross-linking points and to prevent blooming occurred on the surface of the rubber in the presence of unnecessary sulfur. If there are many polysulfide bonds in a rubber composition after vulcanization, they change to monosulfide bonds due to heat of running, and changes of physical properties such as hardness of the obtained tread are promoted. Therefore, 1 to 1.4 parts by weight thereof is preferably mixed in order to improve durability of a tyre.

There is no particular limitation for a vulcanization accelerator. Examples thereof are, for instance, sulfenamides, thiazoles, thiurams, guanidines, dithiocarbamate salts and the like.

In the present invention 1 to 3 parts by weight of the vulcanization accelerator based on 100 parts by weight of the rubber component is mixed from the viewpoint of controlling physical property change and achieving low fuel consumption. From the viewpoint of balance of the above-mentioned properties, 1.5 to 2.5 parts by weight thereof is preferably mixed.

In this case if the amount of the vulcanization accelerator is too small, the physical property change becomes large. On the other hand, if the amount is too large, abrasion property and tread cut resistance become small. From the viewpoint of these reasons, sulfur and a vulcanization accelerator are mixed under the condition that an amount of sulfur X parts by weight and an amount of a vulcanization accelerator Y parts by weight satisfy the following equation: $2X-1 \leq Y \leq 2X$.

In the rubber composition of the present invention, carbon black is preferably mixed from the viewpoint of abrasion resistance, reinforcement and low cost.

There is no particular limitation for the kind of carbon black, as long as it has been conventionally employed in tyre field. Preferably a specific surface area for nitrogen adsorption thereof is 30 to 200 and an adsorption amount of compressed dibutyl phthalate (DBP) is 30 to 150 ml/100 g. If the specific surface area for nitrogen adsorption is below 30 $m^2/g$ or the adsorption amount of compressed DBP is below 30 ml/100 ml, it is inferior in dispersion property and reinforcement of carbon black to a rubber composition. On the other hand, if the specific surface area for nitrogen adsorption is above 200 $m^2/g$ or the adsorption amount of compressed DBP is above 150 ml/100 g, it is inferior in dispersion property of carbon black to a rubber composition and a heat amount thereof becomes large.

Examples of the kind of carbon black are, for instance, HAF, ISAF and SAF, but there is no particular limitation for it.

An amount of carbon black is preferably 25 to 60 parts by weight from the viewpoint of balance between reinforcement (abrasion resistance) and low fuel consumption. And it is more preferably 30 to 50 parts by weight from the viewpoint of low fuel consumption.

To the rubber composition of the present invention, there can be suitably added, except for the above-mentioned components, for instance, filler, an additive such as process oil, an anti-oxidant, stearic acid or zinc oxide in the range of preventing from losing the object of the present invention. There is no particular limitation for filler. Examples thereof are, for instance, silica, clay, calcium carbonate, aluminum hydroxide and the like. There is no particular limitation for process oil. Examples thereof are, for instance, aromatic oil, naphthene oil, paraffin oil, castor oil and the like. There is no particular limitation for an anti-oxidant. Examples thereof are, for instance, reaction products of aldehyde, ketone and amine, amines, derivatives of amines, imidazoles, phenoles and the like.

The rubber composition for tyre tread of the present invention obtained therefrom can be applied to tyre tread by the conventional method.

EXAMPLES

The present invention is further explained in details based on the Examples concretely, but is not limited thereto. "Parts" in Examples means "parts by weight" unless otherwise specified.

Examples 1 to 5

The basic combination is the composition comprising 100 parts of a natural rubber, 50 parts of carbon black, 3 parts of process oil, 2 parts of an antioxidant, 2 parts of stearic acid, 1 part of a wax and 5 parts of zinc oxide based on 100 parts of the rubber. According to the mixing ratio shown in Table 1, the components except for sulfur and a vulcanization accelerator were firstly mixed at 150° C. for four minutes by employing a bunbury mixer. To the obtained mixture were added sulfur and a vulcanization accelerator. And the mixture was kneaded at 80° C. for five minutes by employing an open roll with twin screws to obtain the rubber compositions 1 to 5 for tyre tread of the present invention.

The following materials were employed in Examples.
Carbon black—Diablack I (N220) of ISAF class available from Mitsubishi Chemical Corporation
Process oil—Diana process PS32 available from Idemitsu Kosan Co., Ltd.
Wax—Sannowax available from Ohuchi Shinko Kagaku Kogyo Co., Ltd.
Antioxidant—Ozonone 6C available from Seiko Chemical Co., Ltd.
Stearic acid—Kiri available from NOF CORPORATION
Zinc oxide—Ginrei R available from Toho Zinc Co., Ltd.
Sulfur—Sulfur available from Tsurumi Chemical Co., Ltd.
Accelerator—NOCCELER NS available from Ohuchi Shinko Kagaku Kogyo Co., Ltd.
Sumifine 1162 available from Sumitomo Chemical Co., Ltd. comprising calcined clay containing 33% by weight of N,N'-bis(2-methyl-2-nitropropyl)-1,6-hexane-diamine was employed as N,N'-bis(2-methyl-2-nitropropyl)- 1,6-hexane-diamine component.

And then the rubber compositions of the present invention were applied to green tyres of 10.00R20 to prepare tyres for a truck or a bus with divided tread by vulcanization at 150° C. for 45 minutes.

The obtained tyres were evaluated by the following tests (1) to (4).

Evaluation Tests (1) Loss tangent (viscoelasticity test)

Loss tangent (tan $\delta(60°$ C. )) was measured at the condition of temperature 60° C. and dynamic strain 1.0% by employing a viscoelasticity spectrometer VES made by Iwamoto Seisakusyo Co., Ltd. Rolling resistance and fuel efficiency become low with decreasing tan $\delta(60°$ C. )). Tan $\delta(20°$ C. )) described in the above-mentioned prior arts was employed as an index of heating, but the temperature condition of the present invention (60° C. ) showed higher correlation between fuel efficiency and heating.

(2) Hardness(JIS-A)

A 10 ton truck was equipped with the above-mentioned tyres, and the truck was operated to run 150000 km. Hardness of the tread before and after running was measured by employing JIS-A hardness meter, and increase (change) of hardness was compared. If the change of increase is small, the change of property becomes small and the performance becomes excellent.

(3) Abrasion resistance

An abrasion amount of tyre tread after running was measured, and the results were shown by employing an index based on the abrasion amount of tyre tread comprising the rubber composition obtained in the following Comparative Example 1 as 100. The larger the index becomes, the more excellent the abrasion resistance becomes.

(4) Tread cut resistance

The number of the cut parts on tread surface after running was measured. The smaller the number becomes, the more excellent the tread cut resistance becomes.

Mooney scorch times ($t_{10}$)(min) at 130° C. of the obtained rubber compositions 1 to 5 besides the compositions applied to a tyre were measured by employing a mooney viscometer according to JIS K 6200. The larger the time thereof becomes, the more excellent the property thereof becomes, since the composition is not early vulcanized.

TABLE 1

|  | Example | | | | | Comparative Example | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| mixing ratio (parts) | | | | | | | | | | | | |
| basic rubber composition | 163 | 163 | 163 | 163 | 163 | 163 | 163 | 163 | 163 | 163 | 163 | 163 |
| modifier | 0.66 | 0.66 | 0.66 | 0.66 | 0.99 | 0.66 | 0.66 | 0.66 | 0.66 | 0.66 | 0.33 | 1.65 |
| baked clay | 1.34 | 1.34 | 1.34 | 1.34 | 2.01 | 1.34 | 1.34 | 1.34 | 1.34 | 1.34 | 0.67 | 3.35 |
| sulfur | 1 | 1 | 1.5 | 1.5 | 1 | 0.5 | 0.5 | 0.5 | 0.75 | 0.5 | 1 | 1 |
| vulcanization accelerator | 1 | 2 | 2 | 3 | 2 | 1 | 1.5 | 3 | 1.5 | 1 | 2 | 2 |
| evaluation results | | | | | | | | | | | | |
| tan $\delta$ (60° C.) | 0.11 | 0.1 | 0.08 | 0.08 | 0.09 | 0.14 | 0.14 | 0.11 | 0.13 | 0.09 | 0.12 | 0.07 |
| hardness (JIS-A) | | | | | | | | | | | | |
| before running | 62 | 63 | 64 | 65 | 64 | 61 | 61 | 62 | 61 | 63 | 62 | 65 |
| after running | 66 | 66 | 68 | 69 | 67 | 65 | 65 | 64 | 65 | 69 | 65 | 68 |
| hardness change (increase) | 4 | 3 | 4 | 4 | 3 | 4 | 4 | 2 | 4 | 6 | 3 | 3 |
| abrasion resistance | 93 | 90 | 84 | 80 | 92 | 100 | 96 | 74 | 97 | 87 | 88 | 93 |

TABLE 1-continued

| | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| tread cut property | 6 | 11 | 11 | 13 | 9 | 0 | 2 | 17 | 2 | 9 | 13 | 8 |
| scorch time | 16 | 15 | 14 | 13 | 11 | 19 | 17 | 16 | 17 | 15 | 17 | 9 |

Comparative Examples 1 to 7

Except for the amount shown in Table 1, comparative rubber compositions 1 to 7 were obtained and evaluated in the same manner as in Example 1. The results are shown in Table 1.

By the present invention there can be provided a rubber composition for tyre tread which decreases rolling resistance without decreasing abrasion resistance.

What is claimed is:

1. A tire tread which is obtained by using a rubber composition comprising 100 parts by weight of a rubber component, 0.5 to 1 part by weight of N,N'-bis(2-methyl-2-nitropropyl)-1,6-hexane-diamine contained in calcined clay, 1 to 1.5 parts by weight of sulfur and 1 to 3 parts by weight of a vulcanization accelerator based in 100 parts by weight of the rubber component, and wherein an amount X of sulfur and an amount Y of a vulcanization accelerator satisfy the equation: $2X-1 \leq Y \leq 2X$.

2. The tire tread of claim 1, wherein the composition further comprises 25 to 60 parts by weight of carbon black.

3. The tire tread of claim 1, wherein the N,N'-bis(2-methyl-2-nitropropyl)-1,6-hexane-diamine is present in an amount of 0.5 to 0.8 parts by weight.

4. The tire tread of claim 1, wherein the vulcanization accelerator is present in an amount of 1.5 to 2.5 parts by weight.

5. The tire tread of claim 1, wherein the carbon black is present in an amount of 30 to 50 parts by weight.

* * * * *